(12) United States Patent
Arias López (10) Patent No.: US 7,666,484 B2
(45) Date of Patent: Feb. 23, 2010

(54) READY TO USE FOOD PRODUCT PACKAGING FILM AND PRODUCTION METHOD THEREFOR

(75) Inventor: Juan Luis Arias López, Pamplona (ES)

(73) Assignee: Viscofan, S.A., Pamplona (ES)

( * ) Notice: Subject to any disclaimer, the term of this patent is extended or adjusted under 35 U.S.C. 154(b) by 78 days.

(21) Appl. No.: 10/471,910

(22) PCT Filed: Mar. 12, 2002

(86) PCT No.: PCT/ES02/00112

§ 371 (c)(1),
(2), (4) Date: Aug. 13, 2004

(87) PCT Pub. No.: WO02/074094

PCT Pub. Date: Sep. 26, 2002

(65) Prior Publication Data

US 2004/0258862 A1     Dec. 23, 2004

(30) Foreign Application Priority Data

Mar. 15, 2001   (ES) ............................... 200100601

(51) Int. Cl.
*A22C 13/00*   (2006.01)
*A23L 1/31*    (2006.01)
*B29D 22/00*   (2006.01)
*B29D 23/00*   (2006.01)
*B31B 45/00*   (2006.01)
*B32B 1/08*    (2006.01)
*B65D 81/34*   (2006.01)

(52) U.S. Cl. ................. 428/34.1; 138/118.1; 426/105; 426/132; 426/135; 426/138; 426/140; 428/34.3; 428/34.8

(58) Field of Classification Search ................ 428/34.1, 428/34.3, 34.8; 426/135, 105, 132, 138, 426/140; 138/118.1
See application file for complete search history.

(56) References Cited

U.S. PATENT DOCUMENTS

| | | | | |
|---|---|---|---|---|
| 3,799,823 A | * | 3/1974 | Talty et al. ..................... 156/86 |
| 4,401,135 A | * | 8/1983 | Andra et al. ............. 138/118.1 |
| 4,470,171 A | * | 9/1984 | Rusmussen et al. ......... 138/120 |
| 4,487,231 A | * | 12/1984 | Wolf et al. ............... 138/118.1 |
| 4,563,792 A | | 1/1986 | Niedecker |
| 4,621,482 A | | 11/1986 | Crevasse et al. |
| 4,648,428 A | * | 3/1987 | Story ...................... 138/118.1 |
| 4,649,962 A | * | 3/1987 | Vinokur ................... 138/118.1 |

(Continued)

FOREIGN PATENT DOCUMENTS

EP          0 986 957        3/2000

(Continued)

*Primary Examiner*—Brent T O'Hern
(74) *Attorney, Agent, or Firm*—Notaro & Michalos P.C.

(57) ABSTRACT

Film for wrapping food products, made of an edible or inedible material, curved onto itself along a longitudinal axis to form a cylinder in which the longitudinal side edges of the film are overlapping to a certain extent are in direct contact with each other but not otherwise connected, shirred or wrinkled in the manner of an accordion to form folds perpendicular to the axis of said cylinder, that can have an internal support in the form of a tube of a stiff material, and which can be externally coated by a separation sheet and an also shirred tubular net, and the method for manufacturing it.

21 Claims, 5 Drawing Sheets

U.S. PATENT DOCUMENTS

| | | |
|---|---|---|
| 4,719,116 A | 1/1988 | Crevasse |
| 4,734,956 A | 4/1988 | Frey et al. |
| 4,802,511 A * | 2/1989 | Hensley .................. 138/118.1 |
| 4,910,034 A * | 3/1990 | Winkler ..................... 426/420 |
| 4,924,552 A | 5/1990 | Sullivan |
| 4,958,477 A | 9/1990 | Winkler |
| 5,089,307 A * | 2/1992 | Ninomiya et al. .......... 428/35.2 |
| 5,273,481 A | 12/1993 | Sullivan |
| 5,705,214 A * | 1/1998 | Ito et al. .................... 426/135 |
| 5,834,067 A | 11/1998 | Rodely |
| 5,855,634 A | 1/1999 | Berfield |

FOREIGN PATENT DOCUMENTS

| | | |
|---|---|---|
| EP | 1 018 301 | 7/2000 |
| ES | 8700601 | 10/1986 |
| ES | 2 097 704 | 4/1997 |
| WO | WO 00/40092 | 7/2000 |

* cited by examiner

READY TO USE FOOD PRODUCT PACKAGING FILM AND PRODUCTION METHOD THEREFOR

BACKGROUND OF THE INVENTION

The invention relates to a product, its applications, and a manufacturing method, the product comprising a film or sheet with the form of a tape, hereinafter referred to as "the film", made of an edible or non-edible material, meant for wrapping food products, that has been curved over itself and around a support tube which has a longitudinal axis, to form a cylinder in which the longitudinal side edges of the film, which are parallel to the longitudinal axis of the support tube, are overlapping.

Figure 1:
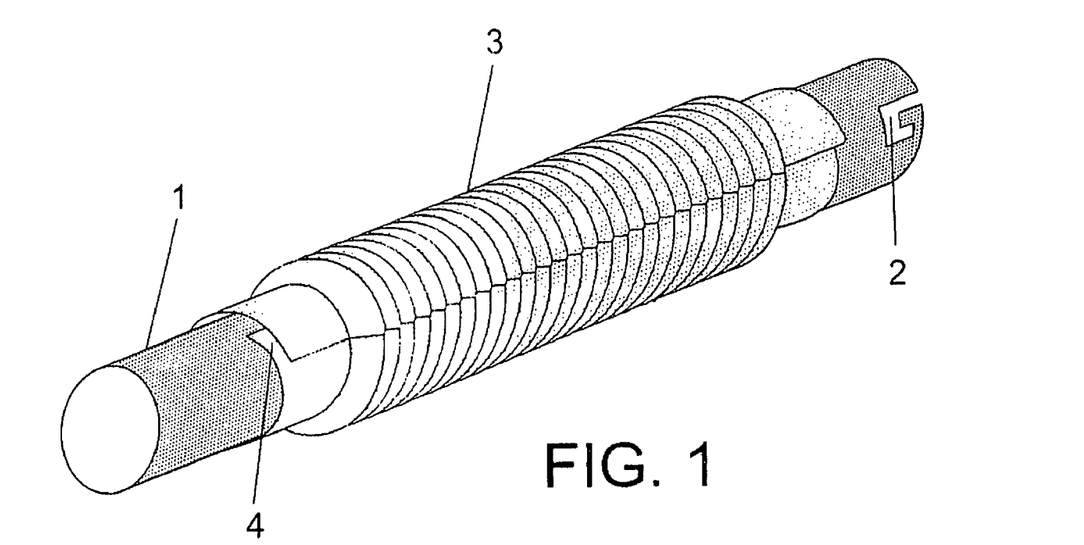
FIG. 1 is a schematic perspective view of a film 3 for wrapping food products made according a preferred embodiment of the invention, suitably coupled to the support tube 1 on which said film is overlapped and shirred.

This cylinder is shirred or wrinkled in an accordion-like shape forming folds, or wrinkles perpendicular to the axis of the cylinder, i.e., transverse folds, in order to contain in it the maximum amount possible of said film. Additionally, as can be seen in FIG. 1, the transverse folds can be uniformly distributed. The cylinder formed by the film curved onto itself and shirred can have an internal support consisting of a tube of a stiff material. The diameter of this tube is smaller than that of the cylinder formed by the film, so that the latter can be suitably shirred or wrinkled on the tube without losing the overlapping of its longitudinal side edges.

The above assembly can be externally coated with an elastic, semi-elastic or non-elastic tubular net in an amount identical in length to the film, placed coaxially to the film and the tube and compressed or shirred in the same extent as the film, so that it occupies the same length. The beginning of the compressed or shirred tubular net can be slightly displaced with respect to the beginning of the shirred film, so that a few centimeters of the latter are left uncovered. Between the shirred film and the compressed tubular net can be placed a cylindrical separation sheet of any material, such as a plastic film. This separation sheet is attached to the support tube at the end opposite the aforementioned beginning of the film curved onto itself and shirred, not covered by the compressed or shirred tubular net.

The above assembly forms a system that by way of a simultaneous unshirring of the film and the net can, continuously or discontinuously, provide a double wrapping formed by the overlapping film and the tubular net that can be filled by closing the film and the net jointly on the open end and stuffing inside a solid or semisolid product with a stuffing horn placed inside the support tube of the assembly. The area of shirred film not coated by the compressed or shirred tubular net ensures that the latter will not prevent the shirred film from unshirring easily because of the compression force exerted on it. As the film and the net are unshirred to form the wrapping, the front ends of the shirred film and net move back in the same extent, so that there is always an area of uncoated and free shirred film. The separation sheet allows the film to become unshirred uniformly and ensures that the portion of shirred film not coated by the compressed net is not carried away by the latter as it unfolds.

The product described can be used for manual or automatic packaging of food products that may or may not be later subjected to any processes of drying, maturing, curing, cooking, sterilization, etc., in which the film casing and outer net assembly are required.

The present invention mainly lies in the field of packaging of food products, and more specifically in the industry of meat products. A great variety of products are wrapped in film for processing, handling and/or conservation. The use of the film is often combined with that of the tubular net, finding specific application in special products where the appearance of the product is an important aspect.

Tying certain meat pieces or cuts with a string before cooking it is a traditional practice used both in homes and industry, and has been known since ancient times. This operation allows on one hand to condition certain meat cuts in manner suitable for cooking or industrial heat treatment when their shape or configuration requires so. This practice also allows stuffing said pieces with other foods and, by keeping the meat pieces joined to each other during cooking, allows a proper bonding of the product.

The string method described soon gave way to other systems facilitating the onerous task of tying the meat pieces. The most commonly used system nowadays is the use of a tubular net, elastic or otherwise, which can be applied more quickly than the string with simple devices.

When, as in the case of the meat industry, meats are used that have been injected brine and that are later subjected to massaging processes, the great bonding capacity of these meats makes the nets stick after the heat treatment and even become coated by the meat itself after the bonding, so that their removal is very difficult. In any event, after the net is eliminated, the meat is considerably damaged superficially and has a poor appearance.

To solve this problem, collagen films began to be interposed between the meat and the net to prevent the net from adhering to the meat and allowing its simple removal, resulting in products with a proper appearance. The use of artificial collagen films also provided other advantages, such as a shiny surface, permeability to smoke, retaining liquids during cooking resulting in more juicy products and higher yields; in addition, the film is completely edible. The procedure for manufacturing said collagen films, as well as the subsequent improvements and changes, are described in U.S. Pat. No. 642,922 and U.S. Pat. No. 5,885,634 (Areso, 1999).

The film and net assembly thus defines a wrapping in which the main function of the film is to contain liquid parts, prevent excessive evaporation during the heat treatment, allow smoking, improve the shine, color and appearance of the surface of the product and facilitate the elimination of the net and of the film itself if it is not edible; it must also be sufficiently soft to allow the net to make its mark on the product giving it its characteristic appearance.

Tubular nets and films are currently applied in the food product industry either manually or mechanically. For this, the films are supplied in cut sheets or in rolls of varying length, which can range from 5 to 250 meters. Nets are supplied as rolls of at least 50 meters length. A manual application method involves wrapping the food product with film and covering it with the net by making it pass through a hollow metal cylinder or tube that serves as a support for a given amount of tubular net that has been shirred or compressed on it coaxially, obtaining the product out of the other end of the cylinder fully covered by the net, which is thus coating it. This product is described in U.S. Pat. No. 4,621,482 (Crevasse, Gammon, Sullivan, 1986). An even simpler procedure is described in U.S. Pat. No. 4,719,116 (Crevasse, 1988).

The mechanical procedure is performed by "applicators" that wrap the product with the film and net simultaneously. A typical applicator consists of a roller bearing a film coil, a device that conforms the film into a tube and a tube that runs inside the conformed film tube and through which the food product is made to pass. Concentric to the previous assembly, a tube is disposed in which a certain amount of net has been compressed. The end of the tube formed by the film and the end of the compressed net are taken jointly forward of the open end of the stuffing horn and closed jointly by a clip, knot or any other suitable method, with the system ready to be stuffed whether by mechanically pumping a product or by a piston driven manually or pneumatically. When the product is impelled out of the tube, it simultaneously pulls on the film and the tubular net, thereby becoming wrapped in both.

This procedure and the device for effecting it are described in U.S. Pat. No. 4,910,034 (Winkler, 1990) and U.S. Pat. No. 4,958,477 (Winkler, 1990), respectively. Also described are devices for compressing the nets, in U.S. Pat. No. 5,273,481 (Sullivan, 1993) and U.S. Pat. No. 4,924,552 (Sullivan, 1990). The following operation is closing the wrapper by a double clip, knot, etc. and cutting the piece of meat to leave the machine ready to repeat the operation. There are machines that incorporate a double clipper and that execute the operations automatically.

In any case, the sequence of operations carried out is as follows:

1) Transporting and installing the applicator in the packaging line. Except for applicators integrated in packaging lines specific for this type of operations, this operation must be performed at the start of each working session. It is part of the equipment setup process and during the time required to perform this the line remains unproductive.

2) Loading the roll of film in the applicator. This must be done each time the roll is finished. The length of film loaded in each roll will determine the frequency of stoppages. This operation is time intensive and must be performed carefully to obtain a properly overlapping film. It is especially complicated in cases where the overlap is on the bottom. This is done such that the film loses the overlap at the outlet of the stuffing horn each time a piece is finished, given its tendency to fall under gravity.

3) Loading the net tube. This must be performed each time a load of a tubular net is finished, which occurs quite often as the amount that may be loaded each time is quite small and ranges from 8 to 18 meters approximately, depending on the diameter and length of the tube and the net characteristics. This operation can be performed manually, but it is more common to use devices known as loaders that simplify the operation considerably. These loaders are described, as mentioned above, in U.S. Pat. No. 5,273,481 (Sullivan, 1993) and U.S. Pat. No. 4,924,552 (Sullivan, 1990).

4) Joint clipping or tying of the first end of film and net. This operation is related to changing the net tube or roll of film, and precedes the start of each stuffing series.

5) Applicator cleaning. This must be performed at least at the end of each working session, each time the device is accidentally dirtied, or as required by hygiene regulations.

It must be pointed out that each type of applicator is only valid for a narrow range of gauges of the final product, so that it is necessary to add to the above operations that of changing the applicator and all components whenever the product is changed to conform to demand, which requires flexibility in production, which is increasingly common in current production processes.

In addition to these minimal operations, it is often necessary to stop the process due to a number of problems inherent to it that the state of the art has not yet managed to solve satisfactorily. These problems include breakage of the film due to excessive rubbing against the applicator parts in contact with it, or due to an excessively tight winding. This problem occurs when the force required to pull it is greater than the strength of the film and is common when the film is moist, dry or dirty, as well as when the parts in contact with the film are moist or dirty.

Certain films stick when moist to the contact surfaces of the applicators due to their surface tension. In other cases they lose strength when in contact with water or when excessively dry. Sometimes a low humidity can increase friction. In short, the humidity conditions of the film significantly affect their behavior during application. Together with the fact that most films are sensitive to changes in humidity and that it is difficult to maintain stable conditions in industrial packaging rooms because of the humidity and low temperature, this means that application of packaging films is a complicated, cumbersome and accident-prone task.

When the above-described problems reach a certain intensity, they lead to the film breaking and the corresponding stoppages that cost time, packaging material, and raw material which must be discarded. In cases where variations in the traction force on the film or the net are not great enough to cause tears, other problems derived from these variations arise. For example, when the traction force required is greater than normal, the products are stuffed under a high pressure and will adopt an undesirable spherical shape, thus increasing their maximum diameter and often losing the film overlap because of this. If the traction force is lower, loose pieces are produced with a cylindrical shape having excessive length that must be recovered manually. It often occurs that a piece that at the beginning is stuffed with a high resistance to traction will, when the stuffing force exceeds said friction, suddenly release an excessive amount of packaging material also resulting in exaggeratedly loose and cylindrical pieces.

Similar problems are caused due to loading the nets on the pneumatic loaders, where oftentimes portions of net loaded are squashed under the net portions loaded previously. As the new material loaded at the end is the first to be used in the application, the squashed fragments will be released with greater difficulty resulting in spherical and tight pieces, or loose cylindrical pieces when the previously described phenomenon occurs.

Another common problem is loss of the overlapping. The mechanical problems inherent to the process mean that the edge overlapping will often be lost. When this occurs, the product is not properly coated by the film resulting in numerous problems, mainly aesthetic and of adherence of the net, which cannot be later removed without tears resulting in lower quality products.

Another problem of this system results from the low pressure under which the products are stuffed in the film and net that hinders a correct de-aeration of the products. In these conditions it is necessary to perforate the film to allow the trapped air to be released during the cooking process to prevent the appearance of surface air bubbles giving a poor appearance to the product. Certain films, particularly the stronger ones, can be perforated before they are used, but in other cases it is necessary to do so after the packaging, implying an additional operation.

All of the above operations, together with their difficulty and the ease with which breakages occur in current systems and other interruptions, make the packaging of products in films and nets a slow, complicated and cumbersome task.

SUMMARY OF THE INVENTION

All of these problems are satisfactorily solved by the current invention, the objects of which are summarized below.

In view of the above, an object of the invention is to provide a film made of an edible or inedible material meant for wrapping food products that is curved onto itself along a longitudinal axis to form a cylinder in which the longitudinal side edges are overlapping and that is shirred. This film is externally coated with an elastic, semi-elastic or non-elastic tubular net. This assembly presents a resistance to stuffing that is lower and more uniform then that of conventional applicators so that the stuffing pressure is better controlled, preventing the production of irregular products that must be reprocessed and the resulting waste of materials and work. This is achieved by a film having a controlled humidity that is not subject to the tension produced by the tube-forming device of the applicators and in which the film shirring process allows controlling its resistance to unshirring.

As relating to the decompression or unshirring of the net that takes place during the filling or stuffing operation simultaneously to the unshirring of the film, as explained above, this occurs smoothly so that at no moment does the compressed net squash the net that is being let out, since because of the manner in which the system is prepared, the compression order of the net is at all times opposite to the decompression order, that is, the last portion of net let out is the first to be compressed.

Another object of the invention is to maintain the overlapping of the film longitudinal side edges throughout the entire stuffing process, thereby preventing production of lower quality products. This is achieved by making the previously overlapped and shirred film form a single body with the net, which thus protects the overlapping not at the end of the stuffing horn as in current applicators but a few centimeters before.

Also the object of the invention is to prevent the film, which is the weakest element in the double wrapping, from breaking during the stuffing or filling process, by the traction on it being performed together with the net which thus protects it sufficiently, and by the film being unshirred for a brief instant before being stuffed, so that the surface is exposed to changes of humidity that could weaken its structure for only a short time, and before that it is protected by its packaging and by the added protection of the net and the separation sheet.

Another object of the invention is to provide a system for packaging products in a film and net that eliminates the time devoted to placing and adjusting the applicators, the film loading time, the time for loading the tubes with the net and for changing the tubes, the time for clipping or tying the first clip or knot after each change and the time for cleaning and removing the applicator when the diameter of the product changes.

Lastly, another object of the invention is to provide a packaging system that does not require the applicators currently used, which are in some cases very expensive and always cumbersome to operate, allowing one to perform the product stuffing process in a conventional stuffing machine which can also be connected to a clipping machine to allow the stuffing operation to take place automatically at a higher speed, or manually simplifying the procedure.

DESCRIPTION OF THE DRAWINGS

As a complement of the description being made and in order to aid a better understanding of the characteristics of the invention, according to an example of a preferred embodiment, an accompanying set of drawings is provided as an integral part of the description that are provided for purposes of illustration only and in a non-limiting sense.

DETAILED DESCRIPTION OF THE PREFERRED EMBODIMENTS

Figure 2:
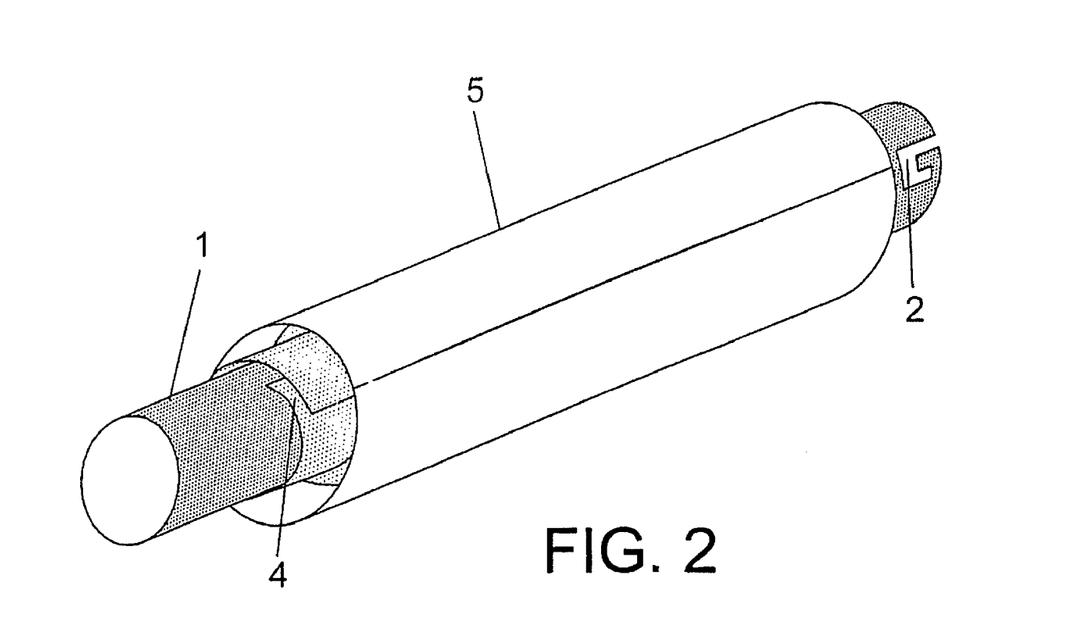
FIG. 2 is a perspective view similar to the previous figure of the same assembly shown in the previous figure after incorporating the separation sheet 5.
Figure 3:
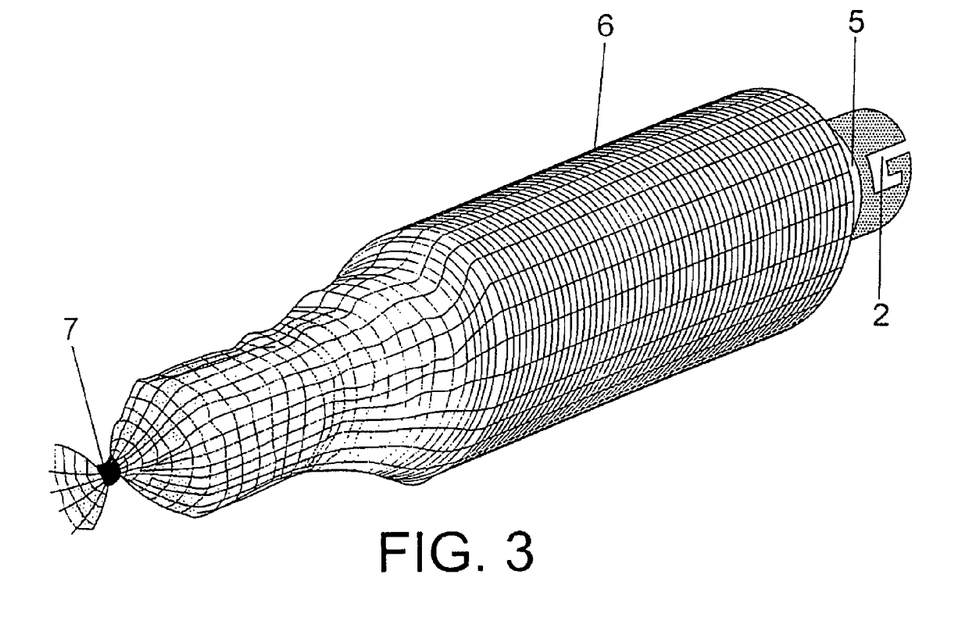
FIG. 3 is another perspective view similar to those of the previous figures, after incorporating to the assembly the outer net 6.
Figure 4:
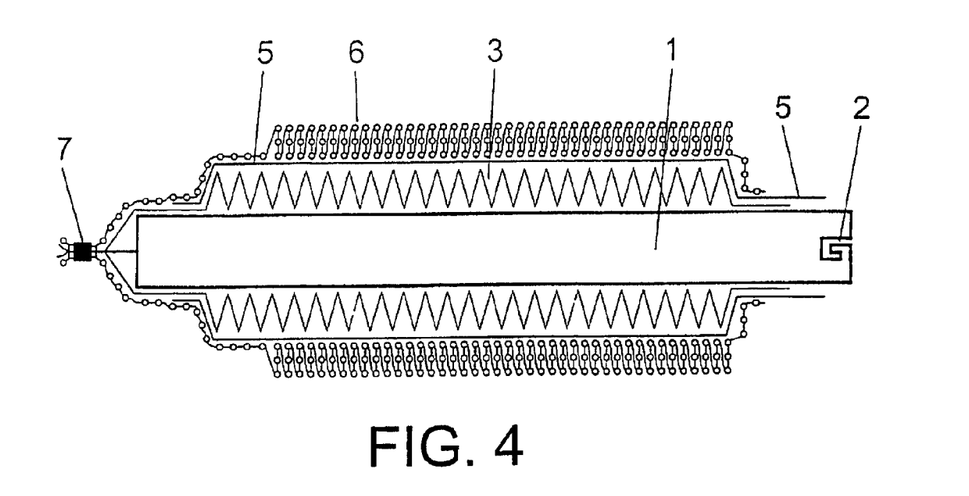
FIG. 4 is a schematic elevation and sectional view of the assembly shown in the previous figure.
Figure 5:
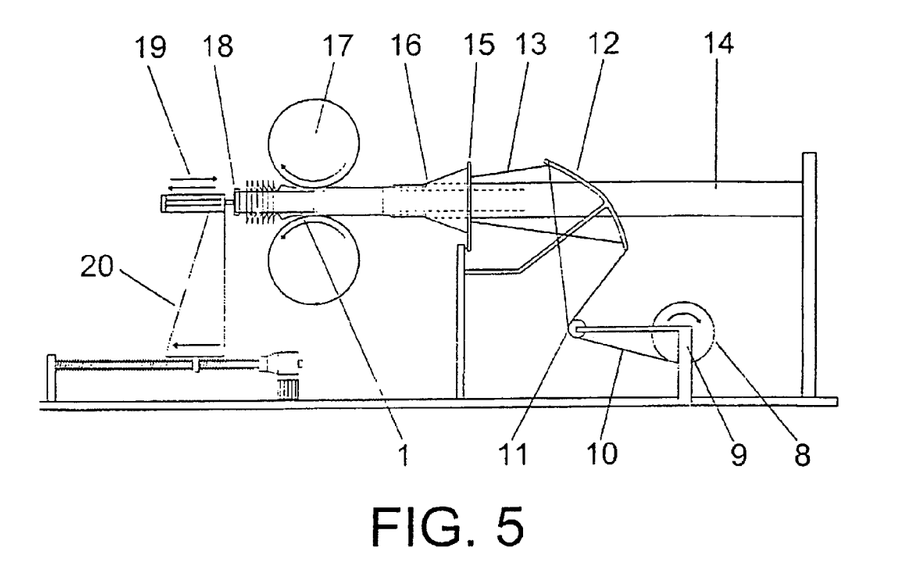
FIGS. 5 and 6 are schematic side view representations of the machines used to shirr the film and the net respectively.

FIGS. 1-4 are provided only for purposes of illustrating the invention. Included within the scope of the invention are other arrangements or designs of both the film and the nets, protection sheets and/or support tubes. The object of the invention, in its most developed version, is illustrated by the preferred embodiments shown in FIGS. 1-4. FIGS. 1 and 2 show a support tube 1 which is cylindrical in shape and has both a longitudinal axis, i.e., an axis which runs from end to end, as well as an attachment means 2. The attachment means 2 is used to secure the support tube 1 to a stuffing horn. On and around the support tube is placed a film 3. Said film 3 having longitudinal side edges which run in the same direction as, i.e., parallel to, the longitudinal axis of the support tube 1. The longitudinal side edges overlap 4 and are in direct contact with each other when the film 3 is on and around the support tube 1. Although the longitudinal side edges overlap 4, touch and are in direct contact with each other, they are not connected to each other as would be the case if an adhesive were placed on or between them to prevent their separation. Referring now to FIGS. 4 and 5, the film 3 is shirred after overlapping its longitudinal side edges 4. The above described assembly is coated with a separation sheet 5 and finally with a tubular net 6, which is also suitably compressed or shirred and that together with the film 3 extends beyond the support tube 1 and is strangled against said net by a clip, knot or staple 7.

The support tube 1 is a stiff tube made of any material, preferably one suitable for being in contact with food products. Its length, inner diameter and wall thickness can vary according to the width of the film, the characteristics of the net, the length of the stuffing horn of the machine used to fill it, the total length of film and net to be shirred and compressed, etc. The stuffing horn on which the system is placed will determine the minimum inner diameter of the support tube, so that the former will fit inside the latter. The same is true of its length, as the stuffing horn must always be longer than the stiff support tube 1 for the film. The thickness of the tube wall will mainly depend on its strength, and should be enough to withstand without deformation the pressure transmitted by accumulating the net, particularly when the net is elastic. The support tube 1 can have any attachment means 2 to the stuffing horn.

The film 3, which can be made of an edible or inedible material, preferably one suitable for being in contact with food products, is curved onto itself along a longitudinal axis that coincides with the axis of the support tube 1 described in the previous paragraph, defining a cylinder in which the longitudinal side edges of the film are overlapping. It has been shirred as an accordion, forming folds or wrinkles perpendicular to said axis in order to insert a maximum length of film in a minimum space.

The overlapping of the longitudinal side edges ensures that the film will enclose the food product properly. This overlapping also allows adapting the film to different product diameters along its longitudinal axis, as the shape of the product is determined by the net which, if it is elastic as is most common, will give the product an oblong shape.

In order to allow the air that is trapped when stuffing the product to exit during the heat treatment, the film 3 can be previously perforated. The size and distribution of the orifices can be variable and should allow air to exit, yet ensure retention of fluids and the mechanical strength of the film.

The protection sheet 5 for the shirred film 3 and, if applicable, for separating the shirred film and the net 6 that is later placed, can be made of any material, preferably one suited to come in contact with food products; its purpose is to separate the shirred film from the compressed net so that when the two are simultaneously deployed, the friction and drag of the film by the net is prevented, so that the deployment is uniform and the film is not damaged by the net. It can comprise an enveloping sheet with the edges glued to form a tube, it can be formed as a tube directly, or can be a simple enveloping sheet suitably overlapped. This sheet is attached to the tube 1 on the rear to prevent the sheet from being carried away by the net when the latter is extended. It can be attached to the tube by an adhesive or by any other suitable method.

Finally, the net 6 comprises a sock or tube-shaped weave with walls made of threads, fibers or string of vegetable-origin materials such as cotton and/or latex, synthetic materials or a mixture thereof, suitably intertwined to form a characteristic weave. The most common nets comprise an elastic thread coated with a cotton or synthetic fiber, arranged in a spiral along the entire length of the sock or tube, with the adjacent coils attached to each other by threads knotted at regular intervals, forming a grid closed on itself in which the transverse fibers are elastic and the longitudinal ones are not. There are also semi-elastic nets in which the weave has a certain degree of elasticity, as well as non-elastic nets. The non-elastic and semi-elastic nets are compressed somewhat in a manner similar to shirring; in elastic nets, the elastic coils of the spiral that form the transverse rings of the net are placed in several concentric layers and held in this position by their elasticity so that any coil is free to open as it is not under another which will be extended later.

The assembly formed by the compressed net, which comprises a length of net equal to that of the shirred film, is placed a few centimeters behind the assembly of the shirred film. The reason for this is so that the front of the film is never pressed by the net and is thus free to be unshirred during the stuffing operation. As the assembly is extended both fronts, that of the shirred film and that of the compressed net, are retracted in parallel keeping this safety distance at all times.

The assembly can incorporate a clip, knot, staple or other suitable mechanism 7 on its open end, as a closure, so that it is not necessary to perform this operation at the start of the stuffing operation.

In order to manufacture the described product, and more specifically to conform and shirr the film 3, a machine is used such as the one shown in FIG. 5, so that a coil 8 mounted on a coil-bearing system 9 is used to supply the film 10 from which the shirred and overlapped film 3 is later obtained. Initially a certain length of film 10 is unwound and made to pass through a tensioning roller 11 and by the tube conforming device 12 so that a cylinder of film is produced with overlapping longitudinal side edges 13 around the spindle 14.

After this, the aforementioned film tube with the overlapping longitudinal side edges passes through the overlapping attachment device or elastic sock 15, which holds the overlapping film cylinder and forces it to slide tightly on the step formed on the spindle 14 by a sudden decrease of its diameter 16 in the forward sense, thus forming longitudinal wrinkles or folds uniformly distributed throughout the entire circumference of the film, and immediately after between the carrying-shirring wheels 17 of the film. The decrease in diameter of the spindle 14 is created when a large diameter section of the spindle 14 tapers off to its smaller diameter section.

After this, the stiff tube 1 is placed on the support 18 of the oscillating shirring system 19 so that it is surrounded by the cylinder of film curved onto itself in the form of a cylinder with overlapping longitudinal side edges.

Then, the cylinder of film curved onto itself with overlapping longitudinal side edges is attached to the support 18 of the oscillating shirring system 19 so that the film is prevented from extending and losing its cylindrical shape and the overlapping.

Afterwards, the carrier wheels 17 are set in motion as well as the oscillating shirring system 19 and the retraction system 20 of the oscillating shirring system so that it will supply cylinder of film curved onto itself with overlapping longitudinal side edges to the stiff tube 1, starting from the film of the coil 8 shaped as a cylinder and shirring it on the stiff tube 1 by way of to-and-fro oscillations of the shirring system, until a stack of shirred and overlapping film is obtained on the stiff tube with a degree of cohesion and tightness determined by the speed of the retraction system.

Figure 6:
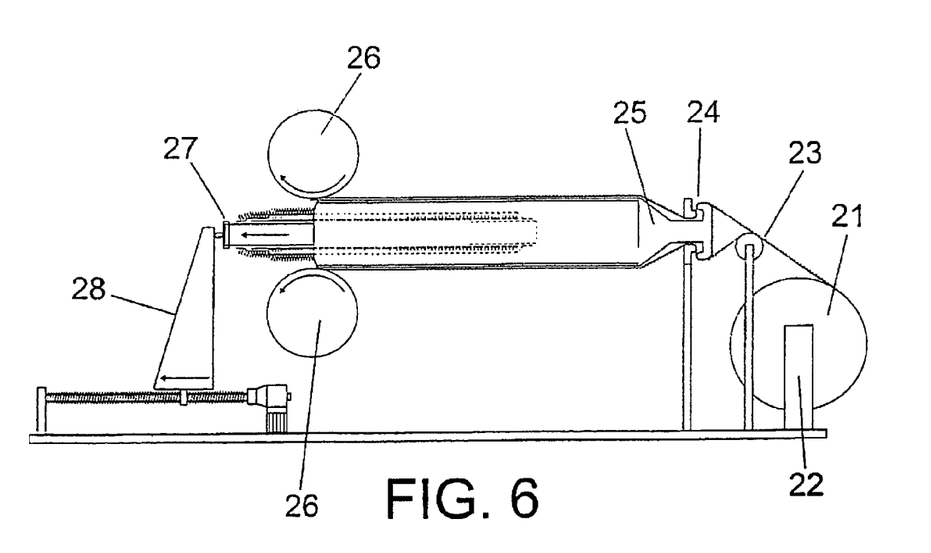

After the shirred film 3 is wrapped about the tube 1 with the separation sheet 5, the net is mounted and shirred by a machine such as that shown in FIG. 6.

Specifically, on this machine, a net coil 21 is placed on its coil bearing system 22 and a certain length of net is unwound and made to pass through a tensioning roller system 23; it is then threaded on the rear end 24 of a floating spindle 25 until it is placed under the carrier wheels 26 of the net.

Then, the stick of film wound on itself in the form of a cylinder with the longitudinal side edges somewhat overlapped and shirred 3 is placed on the stiff tube 1 after the film has been covered by the separation sheet 5 on the support 27 of the stick retraction system 28, and the latter is placed inside the floating hollow spindle 25 until the end of the shirred film is inserted a few centimeters in the spindle.

After this, the carrier wheels 26 and the stick retraction system 28 are set in motion so that the net will fall on the stick as the latter retracts, coating it with an amount of net equivalent in length to the previously shirred film. The density of shirred film is thus given by the speed of the carrier wheels 26 and the retraction system 28.

EXAMPLES

In order to define the scope and characteristics of the invention, the following examples are given illustrating the preferred embodiments of the invention, which are not meant to be limiting of the invention and are provided by way of explanation thereof.

Tests of several types were performed, including shirring films of different widths and materials on tubes of different diameters, and coating them with separation sheets of different materials. The nets employed were elastic nets with characteristics appropriate in each case to the width of the films used.

Example 1

30 meters of collagen film COFFI® of 380 mm width were shirred on a plastic support tube of 50 mm inner diameter and 53 mm outer diameter. These were coated with a separation sheet made of polyethylene 0.04 mm thick, and on the latter were shirred another 30 meters of a latex/polyester elastic net with 16 circumferential spaces and a separation of 5 knots between coils of elastic material, as described above. The film and net assembly occupied 35 cm length with a film front not coated by the net of 5 cm.

A meat product was stuffed inside the shirred film coated with the described net, consisting of lean pork meat with a 20% brine injection cut in irregular pieces of 5 to 7 cm, for which a stuffing machine Handtmann VF 200 was used connected to work automatically with a clipping machine Poly Clip 3462. Pieces of 1,000 g weight were stuffed at a rate of 30 pieces per minute.

The same operation performed in an applicator COFFI® Garos 90 mm coupled to the same stuffing machine and to a double manual clipper with a roll of COFFI® 380 mm wide and 100 m long, and the same type of shirred net at 18 meters each time on the net loader of 30 cm length of the aforementioned applicator was performed at a rate of 10 pieces per minute.

Figure 7:
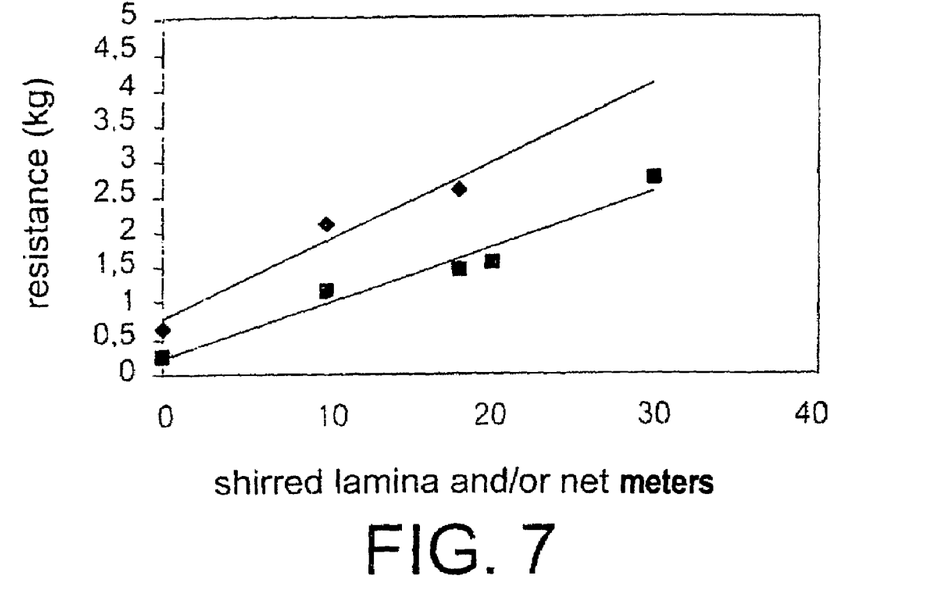
FIGS. 7, 8 and 9 are graphs of the resistance to stuffing of different shirred film and net assemblies, together with the resistance to stuffing found in conventional applicators. These resistances depend on the length of shirred film and net.

The graph in FIG. 7 shows the difference in resistance to stuffing for the two operations as a function of the amount of product unshirred. In both cases, the resistance increases as more product is unshirred since the friction surface on the respective support tubes is also increasing.

However, for the shirred film, the resistance is always less, implying a lower likelihood of breakage and an improved control of the operation as relates to obtaining products with homogenous sizes.

Example 2

25 meters of collagen film COFFI® of 380 mm width were shirred on a plastic support tube of 50 mm inner diameter and 53 mm outer diameter. These were coated with a separation sheet made of polyethylene 0.04 mm thick, and on the latter were shirred another 25 meters of a latex/polyester elastic net with 16 circumferential spaces and a separation of 5 knots between coils of elastic material, as described above. The film and net assembly occupied 30 cm length with a film front not coated by the net of 5 cm.

A meat product was stuffed inside the shirred film coated with the described net, consisting of lean pork meat with a 20% brine injection cut in irregular pieces of 5 to 7 cm, for which a stuffing machine Vemag robot HP 10 C was used connected to work automatically with a clipping machine Poly Clip DFC 8162. Pieces of 1,400 g weight were stuffed at a rate of 27 pieces per minute.

The same operation performed in an applicator COFFI® Garos 90 mm coupled to the same stuffing machine and to a double manual clipper with a roll of COFFI® 380 mm wide and 100 m long, and the same type of shirred net at 18 meters each time on the net loader of 30 cm length of the aforementioned applicator was performed at a rate of 9 pieces per minute.

The graph in FIG. 7 shows the difference in resistance to stuffing for the two operations as a function of the amount of product unshirred. In both cases the resistance increases as more product is unshirred, since the friction surface on the respective support tubes is also increasing.

However, for the shirred film, the resistance is always less, implying a lower likelihood of breakage and an improved control of the operation as relates to obtaining products with homogenous sizes.

Example 3

22 meters of collagen film COFFI® of 470 mm width were shirred on a plastic support tube of 67 mm inner diameter and 70 mm outer diameter. These were coated with a separation sheet made of polyethylene 0.04 mm thick and on the latter were shirred another 22 meters of a latex/polyester elastic net with 22 circumferential spaces and a separation of 5 knots between coils of elastic material, as described above. The film and net assembly occupied 27 cm length with a film front not coated by the net of 5 cm.

A meat product was stuffed inside the shirred film coated with the described net, consisting of lean pork meat with a 20% brine injection cut in irregular pieces of 5 to 7 cm, for which a stuffing machine Vemag robot HP 10 C was used connected to work automatically with a clipping machine Poly Clip DFC 8162. Pieces of 2,600 g weight were stuffed at a rate of 25 pieces per minute.

The same operation performed in an applicator COFFI® Garos 90 mm coupled to the same stuffing machine and to a double manual clipper with a roll of COFFI® 470 mm wide and 100 m long, and the same type of shirred net at 18 meters each time on the net loader of 30 cm length of the aforementioned applicator was performed at a rate of 7 pieces per minute.

Figure 8:
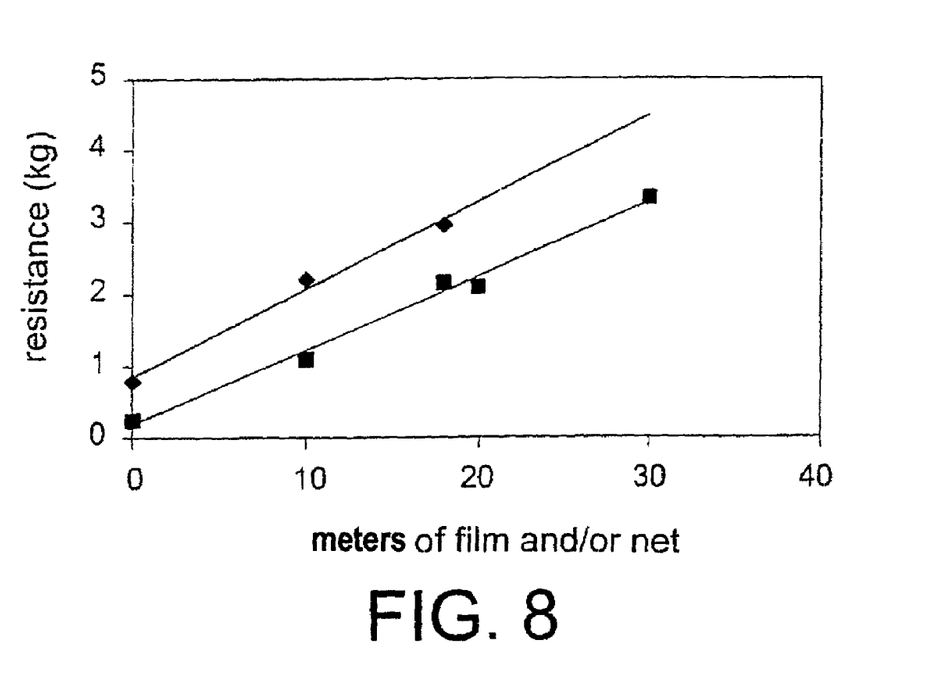

The graph in FIG. 8 shows the difference in resistance to stuffing for the two operations as a function of the amount of product unshirred. In both cases, the resistance increases as more product is unshirred since the friction surface on the respective support tubes is also increasing.

However, for the shirred film, the resistance is always less, implying a lower likelihood of breakage and an improved control of the operation as relates to obtaining products with homogenous sizes.

Example 4

20 meters of collagen film COFFI® of 570 mm width were shirred on a plastic support tube of 67 mm inner diameter and 70 mm outer diameter. These were coated with a separation sheet made of polyethylene 0.04 mm thick and on the latter were shirred another 20 meters of a latex/polyester elastic net with 26 circumferential spaces and a separation of 3 knots between coils of elastic material, as described above. The film and net assembly occupied 25 cm length with a film front con coated by the net of 5 cm.

A meat product was stuffed inside the shirred film coated with the described net, consisting of lean pork meat with a 20% brine injection cut in irregular pieces of 5 to 7 cm, for which a stuffing machine Vemag robot HP 10 C was used connected to work automatically with a clipping machine Poly Clip DFC 8162. Pieces of 4,500 g weight were stuffed at a rate of 18 pieces per minute.

The same operation performed in an applicator COFFI® Garos 150 mm coupled to the same stuffing machine and to a double manual clipper with a roll of COFFI® 570 mm wide and 100 m long, and the same type of shirred net at 18 meters each time on the net loader of 30 cm length of the aforementioned applicator was performed at a rate of 5 pieces per minute.

Figure 9:
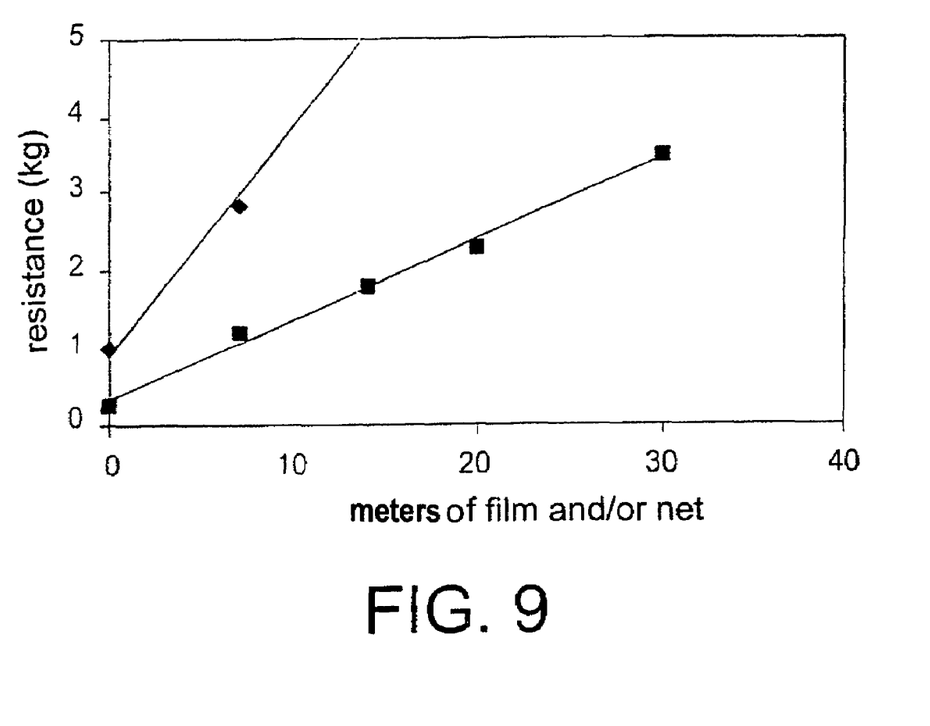

The graph in FIG. 9 shows the difference in resistance to stuffing for the two operations as a function of the amount of product unshirred. In both cases, the resistance increases as more product is unshirred, since the friction surface on the respective support tubes is also increasing.

However, for the shirred film, the resistance is always less, implying a lower likelihood of breakage and an improved control of the operation as relates to obtaining products with homogenous sizes.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

The invention claimed is:

1. A ready-made film assembly for wrapping food products, comprising:
   an edible or inedible material film that, is curved onto itself along a longitudinal axis to form a cylinder that is adapted to be wrapped on a large diameter section of a spindle, with longitudinal side edges of the film overlapping along a direction parallel to the longitudinal axis of the cylinder and with the longitudinal side edges being in direct contact with each other and not otherwise connected to each other to form an overlapping film cylinder, the overlapping film cylinder being forced to slide tightly along the spindle and over a decrease in diameter of the spindle to form longitudinal folds uniformly distributed throughout an entire circumference of the overlapping film cylinder, the overlapping film cylinder also having uniformly distributed transverse folds, the longitudinal folds being parallel to the longitudinal axis of the cylinder and permitting radial collapsing and expanding of the overlapping film cylinder with respect to the longitudinal axis of the cylinder to at least the diameter of the large diameter section of the spindle, and the transverse folds being perpendicular to the longitudinal axis of the cylinder and permitting longitudinal collapsing and expanding of the overlapping film cylinder, from end-to-end;
   an unshirred protection sheet over the film cylinder; and
   a shirred tubular net over the protective sheet, the protective sheet facilitating separation of the net from the overlapping film cylinder.

2. The ready-made film assembly for wrapping food products according to claim 1, wherein the film material is edible collagen of a bovine or porcine origin.

3. The ready-made film assembly for wrapping food products according to claim 1, wherein the film material is non-edible collagen.

4. The ready-made film assembly for wrapping food products according to claim 1, wherein the film material is regenerated cellulose.

5. The ready-made film assembly for wrapping food products according to claim 1, wherein the film material is reinforced or fibrous regenerated cellulose.

6. The ready-made film assembly for wrapping food products according to claim 1, wherein the film material is a plastic material.

7. The ready-made film assembly for wrapping food products according to claim 1, wherein the film material is a polysaccharide.

8. The ready-made film assembly for wrapping food products according to claim 1, wherein the film material is hemp paper.

9. The ready-made film assembly for wrapping food products according to claim 1, wherein the film material is any type of paper.

10. The ready-made film assembly for wrapping food products according to claim 1, wherein the film material is any combination of materials selected from the group consisting of edible collagen of a bovine or porcine origin, non-edible collagen, regenerated cellulose, reinforced or fibrous regenerated cellulose, a plastic material, a polysaccharide, hemp paper, and any type of paper.

11. The ready-made film assembly for wrapping food products according to claim 1, further comprising a coloring pigment or a mixture of pigments to in the film material, continuously or discontinuously, forming at least one of: a drawing, stripes, letters, numbers, and other design.

12. The ready-made film assembly for wrapping food products according to claim 1, further comprising an aromatic substance in the film material.

13. The ready-made film assembly for wrapping food products according to claim 1, further comprising a plastic substance in the film material.

14. The ready-made film assembly for wrapping food products according to claim 1, further comprising perforations in the film to allow aeration.

15. The ready-made film assembly for wrapping food products according to claim 1, wherein the protection sheet is cylindrical in shape or folded on itself in a cylindrical shape.

16. The ready-made film assembly for wrapping food products according to claim 1, wherein the net is an elastic, semi-elastic or non-elastic tubular net.

17. The ready-made film assembly for wrapping food products according to claim 16, wherein the shirred net has approximately a same length as the shirred film cylinder.

18. The ready-made film assembly for wrapping food products according to claim 15, wherein the protection sheet is coated with the tubular net, the protection sheet being configured for separating the net from the film.

19. The ready-made film assembly for wrapping food products according to claim 1, further comprising a support tube of a stiff material inside the film cylinder, wherein the tube is stiff enough to withstand deformation by a pressure transmitted by the shirred net on the assembly.

20. The ready-made film assembly for wrapping food products according to claim 19, wherein the support tube comprises a means for attaching the support tube to a stuffing horn.

21. The ready-made film assembly for wrapping food products according to claim 1, wherein one of the ends of the film cylinder, the protection sheet and the shirred net together are attached by one of a clip, knot, or staple or another attachment mechanism.

* * * * *